United States Patent
Rabinowitz

Patent Number: 5,687,271
Date of Patent: Nov. 11, 1997

[54] SHIELDED FIBER OPTICS CABLE FOR COMPATIBILITY WITH HIGH VOLTAGE POWER LINES

[75] Inventor: Mario Rabinowitz, 715 Lakemead Way, Redwood City, Calif. 94062

[73] Assignee: Mario Rabinowitz, Redwood City, Calif.

[21] Appl. No.: 213,872

[22] Filed: Mar. 15, 1994

[51] Int. Cl.⁶ .................................................. G02B 6/44
[52] U.S. Cl. ..................... 385/101; 385/100; 174/68.1; 174/70 R
[58] Field of Search .......................... 385/101, 100; 174/68.1, 70 R, 72 R, 78

[56] References Cited

U.S. PATENT DOCUMENTS

| | | | |
|---|---|---|---|
| 4,392,714 | 7/1983 | Bruggendieck et al. | 385/101 |
| 4,695,127 | 9/1987 | Ohlhaber | 385/101 X |
| 4,801,192 | 1/1989 | Wehner | 385/101 |
| 4,856,867 | 8/1989 | Gaylin | 174/41 X |
| 4,993,805 | 2/1991 | Abe et al. | 385/101 |
| 5,069,526 | 12/1991 | Oestreich | 385/101 |
| 5,082,379 | 1/1992 | Lindner et al. | 385/101 |
| 5,125,062 | 6/1992 | Marlier et al. | 385/101 |
| 5,133,039 | 7/1992 | Dixit | 385/135 |
| 5,181,026 | 1/1993 | Granville | 340/870.28 |
| 5,189,718 | 2/1993 | Barrett et al. | 385/101 |
| 5,189,719 | 2/1993 | Coleman et al. | 385/101 |
| 5,195,158 | 3/1993 | Bottoms, Jr. et al. | 385/105 |
| 5,204,926 | 4/1993 | Bottoms, Jr. et al. | 385/100 X |
| 5,212,750 | 5/1993 | Wright | 385/69 |
| 5,222,173 | 6/1993 | Bausch | 385/101 |
| 5,237,635 | 8/1993 | Lai | 385/101 |
| 5,317,665 | 5/1994 | Herrebrugh | 385/101 |
| 5,371,825 | 12/1994 | Traut | 385/109 |
| 5,491,766 | 2/1996 | Huynh et al. | 385/101 |
| 5,555,338 | 9/1996 | Haag et al. | 385/101 |

*Primary Examiner*—Brian Healy

[57] ABSTRACT

Method and apparatus are presented for providing an electric field-free region for fiber optic cables in near proximity to high voltage power lines by means of a conducting electrical shield at the same voltage as the power line. An electric field-free region is still provided even if the electrical shield is omitted, by having the wires of the power line completely surround the fiber optic cable. An electric field-free region is also provided by embedding the optical fiber inside each wire of the power line. The electric field free region for a fiber optic cable prevents electrical treeing and other undesirable effects that would make the cable inoperable.

10 Claims, 1 Drawing Sheet

SHIELDED FIBER OPTICS CABLE FOR COMPATIBILITY WITH HIGH VOLTAGE POWER LINES

BACKGROUND OF THE INVENTION

FIELD OF THE INVENTION

There is great interest in combining power lines with fiber optic cables to also carry telecomunications as part of the future communications highway. It should not be taken for granted that fiber optic cables will be trouble free on high voltage overhead lines. Over a long period of time, the effects of electric stress and high voltage corona will degrade an unshielded fiber optics cable because the fiber is exposed to a high electric field. Electrical treeing in the fibers is one degradation mechanism. (This would not be a problem outside the ground sheath of an underground power cable, as there is no electric field there from the high voltage line.) Although the grounded shield wires of an overhead line have a much lower electric field environment than the power lines, lightning is more likely to strike the grounded shield lines and damage the optical fibers. It is not always possible to put optical fiber cables on low voltage phone lines. In the case of long distances there are no phone lines on which the fiber optic cable can be carried because distant phone transmission is by microwaves.

Though it may not be expected, deleterious effects can result to an unshielded fiber optics cable that is combined with a high voltage power line. If, over a long period of time, the electric field produces suficient deterioration even in just one location of a long length of fiber, the transmission of information of the entire length of the fiber will be disrupted. This is due to the high electric field that emanates from the power line, which stresses the dielectric material of the optics cable. For a dc power line, the fiber optics cable is polarized by the electric field, and the electric stress internal to the cable can cause deterioration of its optical properties.

For an ac power line, the fiber optics cable is alternately polarized in one direction and then the opposite direction as the electric field alternates. For a 60 Hz power line this change in polarization takes place 120 times per second which causes a dielectric power loss in the optics cable as well as stressing the fiber.

This invention pertains to method and apparatus for shielding the fiber optics cable from the high electric field of the power line. By nesting the fiber cable in a conducting sheath at the same potential (voltage) as the power line, the fiber cable will be in an electric field-free region. It will thus be immune from the deleterious effects of electric stress.

Definitions

"Fiber optics cable" or "fiber" or "cable" as used here refers to the transmission of light through long thin, flexible fibers of glass, plastic, or other transparent materials. The index of refraction is so tailored in these fibers that there is essentially total internal reflection. Thus light energy can travel for long distances in long lengths of these fibers with little dissipation. For some purposes, bundles of parallel fibers are used, as for example, in transmitting complete images. The advantage of fiber optics cables is that they can carry very large bandwidths and hence a high density of information.

"Electric field" or "stress" refers to a voltage gradient. An electric field can produce a force on charged objects, as well as neutral objects. The force on neutral objects results from an interaction of the electric field on intrinsic or induced electric polar moments in the object.

"Electric field-free region" or "substantially electric field-free region" refers to a region of space which is either totally free of the electric field associated with a high voltage power line, or in which the electric field of the line is greatly attenuated. For example, at the open ends of a tubular shield, the electric field penetrates a short distance inside the shield. However, the attenuation of the field is very rapid so that the field is a tiny fraction of its original magnitude just several diameters in from the open ends. As used herein a "substantially electric field-free region" refers to an attenuation of at least a factor of 5 compared to the original external field magnitude over most of the region containing the fiber optic cable. There is a high frequency electromagnetic field associated with the transmission of light (photons) in the optical fibers, and electric field-free does not refer to the high frequency electric field of the light.

"Electrical treeing" refers to the formation of branching structures in a dielectric due to high electric stress, and is similar to Lichtenberg figures. Electrical trees occur in the dielectric (e.g. cross-linked polyethylene) of underground transmission cables, and are related to electrochemical trees and water trees.

"Shield" or "sheath" as used here refers to a conducting envelope which surrounds the fiber optics cable to create an electric-field free environment. In addition to a separate conducting envelope, the wires of the high voltage power line can act as a shield themselves if the fiber optics cable is embedded in them as will be described as one embodiment of this invention.

"Topological" concepts will be employed herein to a small extent. It is helpful to utilize the term "topological" as the fiber optic cables and power lines are somewhat flexible. Thus a strictly rectilinear rigid geometry is not the most appropriate mode of description or delineation of the structures disclosed. In popular parlance, "topology" may be thought of as 'rubber sheet geometry.' A "topological product" is the generalization of the Cartesian product. For example, a "topological cylinder" is the topological product of a topological circle and a topological line segment. Likewise a "topologically cylindrical volume" denotes the topological product of a topological disk and a topological segment.

Description of the Prior Art

In U.S. Pat. No. 4,856,867 entitled Carrier Cable, Fiber Optic Cable, and Sheath Support Assembly issued to Wayne I. Gaylin on Aug. 15, 1989, a sheath is provided whose purpose relates to support for the fiber optic cable, and a coefficient of linear expansion which is substantially less than that of the messenger strand. It does not provide for an electric field-free region for the fiber optic cable as in the instant invention.

In U.S. Pat. No. 5,133,039 entitled Aerial Fiber Optic Cable Case issued to Mayankkumar M. Dixit on Jul. 21, 1992, a fiber optic cable case is provided. Its purpose is to provide an aerial support for a fiber optic cable, and to provide a weather-resistant covering for the cable. It is not concerned with an electric field-free region for the fiber optic cable.

In U.S. Pat. No. 5,181,026 entitled Power Transmission Line Monitoring System issued to J. Michael Granville on Jan. 19, 1993, a complete apparatus is described for the measurement of voltage and phase angle plus ambient and line temperature. It does not provide for an electric field-free region for the fiber optic cable.

In U.S. Pat. No. 5,189,719 entitled Metallic Sheath Cable issued to Allan Coleman and Wayne J. Kowalski on Feb. 23, 1993 a tubular metallic sheath is provided for carrying one or more electrical conductors and/or one or more fiber optic elements. Since the electrical conductor and the fiber optic element are both together inside the sheath, the fiber optic cable is not shielded from the electric field of the electrical conductor. For this reason it is not concerned with an electric field-free region for the fiber optic cable.

U.S. Pat. No. 5,195,158 entitled Tight Buffered Fiber Optic Groundwire Cable issued to Jack Bottoms, Jr. on Mar. 16, 1993, describes a complete fiber optic telecommunications bundle for use between support towers of an electric power transmission network. The central support core is conducting, but the fiber optic cables are exposed to the electric field of the power line. Supporting them on the ground wire (also called shield line) makes the fiber optic cable more vulnerable to lightning strikes. The purpose of the ground wire is to protect the high voltage lines from lightning strikes. Although a strain jacket is provided, it does not provide electrical shielding for the fiber optic cables. Therefore, this patent does not provide for an electric field-free region for the fiber optic cable.

U.S. Pat. No. 5,204,926 entitled Tight Buffered Fiber Optic Groundwire Cable issued to Jack Bottoms, Jr. on Apr. 20, 1993, describes a complete fiber optic telecommunications bundle for use between support towers of an electric power transmission network. The central support core is conducting, but the fiber optic cables are exposed to the electric field of the power line. Supporting them on the ground wire (also called shield line) makes the fiber optic cable more vulnerable to lightning strikes than if they were supported on the high voltage lines. The purpose of the ground wire is to protect the high voltage lines from lightning strikes. Although a strain jacket is provided, it does not provide electrical shielding for the fiber optic cables. Again, as in his previous patent, this patent is not concerned with an operational electric field-free region for the fiber optic cable.

U.S. Pat. No. 5,212,750 entitled Fiber Optic Harness Having Reduced Weight and Bulk, and Method issued to James R. Wright on May 18, 1993, describes a branched fiber optics bundle. Although an outer protective sheath is provided, it does not explicitly provide electrical shielding for the fiber optic cables. This assembly is not intended for support from a high voltage power line, and at best his sheath would be at ground potential. This is antithetical to the instant invention in which the sheath is at the same high voltage potential as the power line from which it is supported. This patent is not concerned with an electric field-free region for a fiber optic cable adjacent to or near a high voltage power line.

Thus the prior art contains no teaching for the protection of a fiber optic cable from the electric field of a power line, by means of a shield which provides an electric field free region for a fiber optic cable to prevent electrical treeing and other undesireable effects that would make the cable inoperable.

SUMMARY OF THE INVENTION

There are many aspects and applications of this invention. This invention deals with the broad general concept of the method and apparatus whereby a fiber optics cable can be made compatible with a high voltage line by means of an electric field-free region. It is possible to have the fiber in an electric field-free environment by enclosing it in a conducting sheath. However the sheath could not be at ground potential and be near a high voltage line due to the possibility of electrical breakdown between the line and the sheath. This disclosure is to have a conducting sheath and to have the sheath at the same potential as the high voltage line by electrically tieing the sheath to the high voltage line. The region inside the sheath will be free of an electric field.

In accordance with the illustrated preferred embodiments, method and apparatus is presented that is capable of providing an electric field free region for a fiber optic cable. This invention deals with the broad general concept of method and apparatus whereby a long length of fiber optic cable may be adjacent to a high voltage power line, and yet be free of an electric field. This will permit it to have a long and trouble-free life in its application.

Applications of this invention relate to a wide variety of combined fiber optic cable telecommunications, together with electric power transmission.

DETAILED DESCRIPTION OF THE PREFERRED EMBODIMENTS

Figure 1:
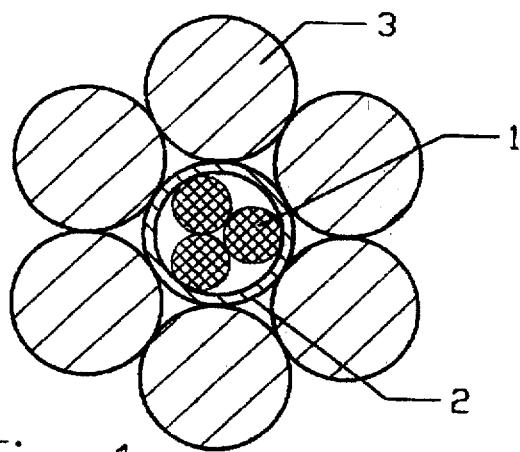
FIG. 1 is a cross-sectional schematic view of a power line showing the wires of the line surrounding the fiber optic cables inside an electrical shield.

FIG. 1 is a cross-sectional schematic view of a fiber optic cable 1 inside a conducting electrical shield 2 surrounded by the wires 3 of a high voltage power line. The electrical shield 2 is at the same potential as the power line as it is in electrical contact with the wires. The space inside the electrical shield 2 is an electric field-free region. Three optical fibers 1 are shown for convenience. However, any desired number of optical fibers 1 may be packed into the space. When the shield 2 is present, the wires need not touch along their complete length as the continuity of the shield 2 provides the necessary requirement for the region to be electric field-free.

This is a preferred embodiment of the instant invention for complete shielding and protection of the fiber optic cable 1.

Figure 2:
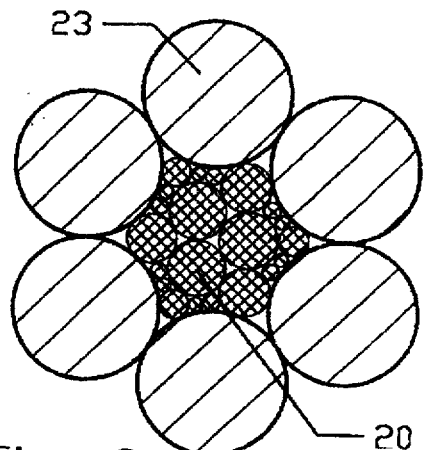
FIG. 2 is a cross-sectional schematic view of a power line showing the wires of the line surrounding the fiber optic cables.

FIG. 2 is a cross-sectional schematic view of a fiber optic cable 20 surrounded by the wires 23 of a high voltage power line. The wires 23 themselves act as an electrical shield so that the space that they enclose is an electric field-free region. Since the fiber optic cable 20 is surrounded by the wires 23 of the power line, one may omit the shield 2 of FIG. 1, since the space holding the fiber optic cable 20 defined by the contiguous wires is electric field-free. For cost savings, the shield 2 may be omitted-the tradeoff being that without the shield 2, there is a possibility that separation of the wires will permit a small amount of electric field into the region containing the fiber optic cable 20. The optical fibers 20 may be of different diameters to maximize the packing fraction. This can generally be done well with three diameters as is well known. Any desired number of optical fibers 20 may be packed into the space. However, when the shield 2 is omitted, the packing of optical fibers 20 must not cause a separation of the wires 23 of the power line. It is the continuous peripheral contiguity of the wires 23 which makes the internal space electric field-free when the shield 2 is omitted. The transposition of the wires 23 as they are wound around the fibers 20 helps to maintain them in continuous contact with each other. There is still substantial attenuation of the electric field if there is a slight separation of the wires. No separation of the wires is preferable as this results in complete shielding.

Figure 3:
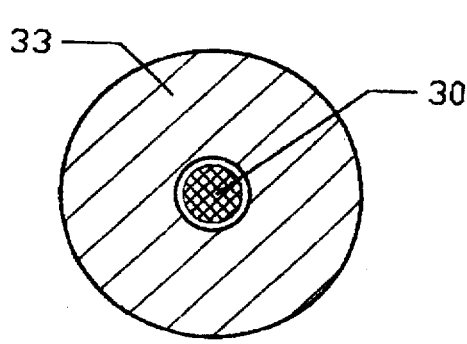
FIG. 3 is a cross-sectional view of a single hollow wire of a power line in which is embedded an optical fiber.

FIG. 3 is a cross-sectional view of an optical fiber 30 which is embedded inside a hollow conducting wire 33 of a power line. No matter what the voltage of the wire, the region inside it is electric field-free.

Figure 4:
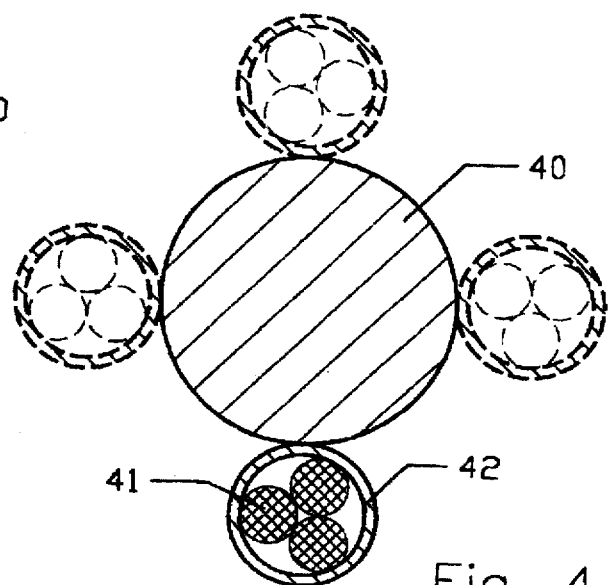
FIG. 4 is a cross-sectional view of a power line around which is spiral wound a fiber optic cable inside a conducting electrical shield.

FIG. 4 is a cross-sectional view of a power line 40 around which is spiral wound a conducting electrical shield 42, inside of which is a fiber optic cable 41. The broken lines indicate the shield 42 and cable in various transposed positions around the line 40. Of course, more than one shield enclosing a fiber optic cable may be wound around a power line.

The magnitude of electric field penetrating in from the open ends of the shield 42 can be further decreased by extending the shield 42 for an appreciable distance over the fiber optic cable 41 beyond the high voltage region, as the fiber optic cable 41 is directed away from the high voltage line 53 laterally or vertically.

In addition to metallic conductors for the shield 42, carbon impregnated plastics such as cross-linked polyethylene; and conducting polymers are also possible shields.

Figure 5:
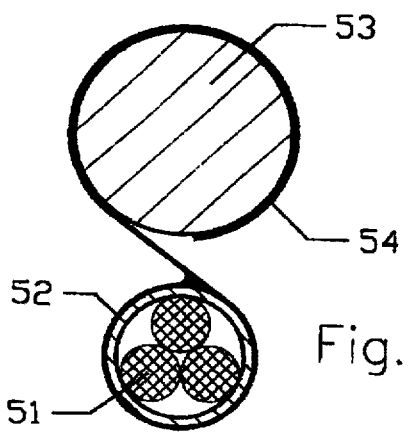
FIG. 5 is a cross-sectional view of a power line around which is a spiral clip supporting a fiber optic cable inside a conducting electrical shield.

FIG. 5 is a cross-sectional view of a power line 53 around which is a support structure 54 spaced along the length of the line 53 supporting a fiber optic cable 51 inside a conducting electrical shield 52. A preferred embodiment is to have the support structure 54 (shown as an aggregation of sprial clips) electrically conducting so that the shield 52 is at the same potential (voltage) as the line 53. At the open ends of the tubular shield 52, the electric field penetrates inside the shield a short distance. However, the attenuation of the field is very rapid so that the field is a tiny fraction of its original magnitude just several diameters in from the open ends. The magnitude of electric field penetrating in from the open ends can be further decreased by extending the shield 52 for an appreciable distance of at least 3 feet over the fiber optic cable 51 beyond the high voltage region,as the fiber optic cable 51 departs away from the high voltage line 53.

Although a preferred embodiment is to have the support structure 54 electrically conducting, the instant invention may be practiced in modified form with the support structure 54 non-conducting. In this case, the shield 52 would be at a lower potential than that of the power line 53. The shielding function would then be related to the shield's conductivity, permeability, and thickness. The skin depth is inversely proportional to the square root of the product of (conductivity)×(permeability)×(frequency of the electric field). In this case the electric field decreases exponentially inside the thickness of the shield 52. For example if the thickness of the shield 52 is two skin depths, the electric field will be attenuated by a factor of 7.4.

Another embodiment of this invention which permits the shield to be at a lower potential than the line, is to utilize a voltage-regulator feedback control circuit with a regulated voltage set-point. This circuit would connect the shield and the power line.

While the invention has been described with reference to preferred and other embodiments, the descriptions are illustrative of the invention and are not to be construed as limiting the invention. Thus, various modifications and applications may occur to those skilled in the art without departing from the true spirit and scope of the invention as summarized by the appended claims.

What is claimed is:

1. A signal transfer assembly comprising an electrical power line adopted to carry a power signal;

a fiber optic cable adjacent to the power line and adapted to carry an optical signal, said power line having a first peripheral surface and said cable having a second peripheral surface, said first and second peripheral surfaces being adjacent to each other; and an electrically conducting shield surrounding said cable and being between the cable and the power line, said shield is adjacent to an outer peripheral portion of said power line, with at least one electrically conductive clip connected to the shield, said clip being carried by said power line.

2. A signal transfer assembly comprising:

an electrical power line adapted to carry a power signal; and a fiber optics cable adjacent to the power line and adapted to carry an optical signal, said power line having a first peripheral surface and said cable having a second conducting peripheral surface, said peripheral surfaces being adjacent to each other having surface structure in proximity to cause the fiber optics cable to be shielded from an electric field of the power line, said first peripheral surface is internal to the power line, said second peripheral surface being on the outer portion of the cable and in surface to surface contact with the first peripheral surface.

3. A fiber optics cable assembly as set forth in claim 2, wherein the first and second surfaces are transversely circular, said first surface being an inner peripheral surface and said cable being within the first surface and surrounded thereby.

4. In the field of fiber optics cable communications, wherein such a cable is located in the immediate vicinity of a parallel high voltage power transmission line, an apparatus for protecting said fiber optics cable from the gradual damage which is threatened by long term exposure to high electric fields originating in said power line, said apparatus comprising:

a topologically cylindrical conductive sheath for axial containment of said cable in its hollow interior; and means for maintaining said sheath at substantially the same electric voltage potential as that of said adjacent power line:

whereby said interior of said sheath provides a substantially electric field-free topologically cylindrical volume in which said cable nests, and thereby provides said cable with substantial immunity to the deleterious effects of electric stress, wherein said means for maintenance of said sheath's voltage further comprising:

an active voltage-regulator feedback control circuit for maintaining said potential of said conductive sheath at a preselected, regulated set-point; and means for selecting said set-point to be substantially identical to the value of said potential of said power line.

5. In the field of fiber optics cable communications, wherein such a cable is located in the immediate vicinity of a parallel high voltage power transmission line, an apparatus for protecting said fiber optics cable from the gradual damage which is threatened by long term exposure to high electric fields originating in said power line, said apparatus comprising:

a topologically cylindrical conductive sheath for axial containment of said cable in its hollow interior; and means for maintaining said sheath at substantially the same electric voltage potential as that of said adjacent power line:

whereby said interior of said sheath provides a substantially electric field-free topologically cylindrical volume in which said cable nests, and thereby provides said cable with substantial immunity to the deleterious effects of electric stress, wherein said means for maintenance of said potential of said conductive sheath in substantial identity with that of said high voltage power line additionally comprises:

at least one direct short-circuit connection between said line and said conductive sheath, said sheath and said short circuit connection to said power line additionally comprising:

said power line arrayed externally to, but not in continuous contact with, said sheath; and a plurality of conductive attachment elements whereby said line is attached intermittently to said sheath.

6. In the field of fiber optics cable communications, wherein such a cable is located in the immediate vicinity of a high voltage power transmission line, the method of protecting said fiber optics cable from the gradual damage which is threatened by long term exposure to high electric fields originating in said power line, said protection being achieved by the steps of:

providing for axial containment of said cable inside a topologically cylindrical conductive sheath; and maintaining said sheath at substantially the same electric voltage potential as that of said adjacent power line, whereby the interior of said sheath provides a substantially electric field-free topologically cylindrical volume in which said cable nests, and thereby provides said cable with substantial immunity to the deleterious effects of electric stress;

maintaining the potential of said conductive sheath at a preselected, regulated set-point by means of an active voltage-regulator feedback control circuit; and means for selecting said set-point to be substantially identical to the value of said potential of said power line.

7. In the field of fiber optics cable communications, wherein such a cable is located in the immediate vicinity of a high voltage power transmission line, the method of protecting said fiber optics cable from the gradual damage which is threatened by long term exposure to high electric fields originating in said power line, said protection being achieved by the steps of:

providing for axial containment of said cable inside a topologically cylindrical conductive sheath; and maintaining said sheath at substantially the same electric voltage potential as that of said adjacent power line, whereby the interior of said sheath provides a substantially electric field-free topologically cylindrical volume in which said cable nests, and thereby provides said cable with substantial immunity to the deleterious effects of electric stress;

maintaining the potential of said conductive sheath at a preselected, regulated set-point by means of an active voltage-regulator feedback control circuit; and means for selecting said set-point to be substantially identical to the value of said potential of said power line, said maintenance of said potential of said conductive sheath in substantial identity with that of said high voltage power line is accomplished by an additional step of:

providing at least one direct short-circuitry connection between said line and said conductive sheath;

choosing said sheath to comprise a separate topologically cylindrical conductive structure containing said cable;

arranging said power line to run externally to, but not in continuous contact with said sheath; and attaching said line intermittently to said sheath by means of conductive attachment elements.

8. In the field of fiber optics cable communications, wherein such a cable is located in the immediate vicinity of a high voltage power transmission line, the method of protecting said fiber optics cable from the gradual damage which is threatened by long term exposure to high electric fields originating in said power line, said protection being achieved by the steps of:

providing for axial containment of said cable inside a topologically cylindrical conductive sheath;

maintaining said sheath at substantially the same electric voltage potential as that of said adjacent power line, whereby the interior of said sheath provides a substantially electric field-free topologically cylindrical volume in which said cable nests, and thereby provides said cable with substantial immunity to the deleterious effects of electric stress; and extending said sheath around said cable beyond the point at which said line and said cable terminally bifurcate.

9. A signal transfer assembly comprising an electrical power line adopted to carry a power signal;

a fiber optic cable adjacent to the power line and adapted to carry an optical signal, said power line having a first peripheral surface and said cable having a second peripheral surface, said first and second peripheral surfaces being adjacent to each other; and an electrically conducting shield surrounding said cable and being between the cable and the power line, said sheath extending around said cable beyond the point at which said line and said cable-terminally bifurcate.

10. A signal transfer assembly comprising an electrical power line adopted to carry a power signal;

a number of spiral fiber optic cables adjacent to the power line and each adopted to carry an optical, said power line having a first peripheral surface and said cable having a second peripheral surface, said first and second peripheral surfaces being adjacent to each other;

equipotential electrical shield means surrounding said cables and being between the cables and the power line, each cable having a shield surrounding the same, to exclude high intensity electric fields, each shield being in engagement with an adjacent portion of the power line;

wherein there is provided a single optical cable extending spirally about the outer surface of the power line and being in contiguous relationship with respect thereto.

* * * * *